US009637616B2

(12) United States Patent
Yao et al.

(10) Patent No.: US 9,637,616 B2
(45) Date of Patent: May 2, 2017

(54) RESIN COMPOSITION AND RESIN MOLDED ARTICLE

(71) Applicant: FUJI XEROX CO., LTD., Tokyo (JP)

(72) Inventors: Kenji Yao, Kanagawa (JP); Hisae Yoshizawa, Kanagawa (JP); Minquan Tian, Kanagawa (JP); Masahiro Moriyama, Kanagawa (JP); Ryo Tanaka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/829,100

(22) Filed: Aug. 18, 2015

(65) Prior Publication Data

US 2016/0280892 A1    Sep. 29, 2016

(30) Foreign Application Priority Data

Mar. 26, 2015   (JP) ................. 2015-064719

(51) Int. Cl.
*C08L 1/00*  (2006.01)
*C08L 1/02*  (2006.01)

(52) U.S. Cl.
CPC ...................... *C08L 1/02* (2013.01)

(58) Field of Classification Search
CPC ............... C08K 5/11; C08L 1/00; C08L 1/02
See application file for complete search history.

(56) References Cited

U.S. PATENT DOCUMENTS

| | | | |
|---|---|---|---|
| 5,919,920 A | 7/1999 | Murakami et al. | |
| 5,962,677 A | 10/1999 | Murakami et al. | |
| 2008/0246189 A1* | 10/2008 | Kuzuhara | B29C 41/28 264/334 |
| 2011/0081495 A1 | 4/2011 | Hayashi et al. | |
| 2012/0142910 A1 | 6/2012 | Buchanan et al. | |
| 2012/0165517 A1 | 6/2012 | Uehira et al. | |
| 2015/0259507 A1 | 9/2015 | Imanishi et al. | |

FOREIGN PATENT DOCUMENTS

| | | |
|---|---|---|
| JP | H08-337601 A | 12/1996 |
| JP | 2002-146045 A | 5/2002 |
| JP | 02-363342 A | 12/2002 |
| JP | 2005-194302 A | 7/2005 |
| JP | 2006-176610 A | 7/2006 |
| JP | 2006-299012 A | 11/2006 |
| JP | 2007-051304 A | 3/2007 |
| JP | 2007-260990 A | 10/2007 |
| JP | 2008-156416 A | 7/2008 |
| JP | 2011057959 A | 3/2011 |
| JP | 2011-068767 A | 4/2011 |
| JP | 2011-083955 A | 4/2011 |
| JP | 2013-066816 A | 4/2013 |
| JP | 2014-012852 A | 1/2014 |
| JP | 2014-028935 A | 2/2014 |
| JP | 2014084343 A | 3/2014 |
| WO | 2009/151018 A1 | 12/2009 |
| WO | 2014/061644 A1 | 4/2014 |

OTHER PUBLICATIONS

Sep. 20, 2016 Office Action issued in Japanese Patent Application No. 2015-064719.
Sep. 20, 2016 Office Action issued in Japanese Patent Application No. 2015-064762.
Oct. 4, 2016 Office Action issued in Japanese Patent Application No. 2015-064766.
Oct. 4, 2016 Office Action issued in Japanese Patent Application No. 2015-064765.
Dec. 13, 2016 Office Action issued in Japanese Patent Application No. 2015-064762.
Jun. 15, 2016 Office Action issued in U.S. Appl. No. 14/824,331.
Jun. 16, 2016 Office Action issued in U.S. Appl. No. 14/837,645.
Jun. 13, 2016 Office Action issued in U.S. Appl. No. 14/822,087.
U.S. Appl. No. 14/837,645, filed Aug. 27, 2015 in the name of Yao.
U.S. Appl. No. 14/822,087, filed Aug. 10, 2015 in the name of Yoshizawa et al.
U.S. Appl. No. 14/824,331, filed Aug. 12, 2015 in the name of Moriyama et al.
Dec. 29, 2016 Office Action issued in U.S. Appl. No. 14/824,331.
Dec. 29, 2016 Office Action issued in U.S. Appl. No. 14/822,087.
Jan. 10, 2017 Office Action issued in Japanese Patent Application No. 2015-064765.
Jan. 10, 2017 Office Action issued in Japanese Patent Application No. 2015-064766.

\* cited by examiner

*Primary Examiner* — Kaj K Olsen
*Assistant Examiner* — Alexander Polyansky
(74) *Attorney, Agent, or Firm* — Oliff PLC

(57) ABSTRACT

A resin composition includes a non-substituted cellulose resin having a weight average molecular weight in a range of 10,000 to 75,000.

7 Claims, No Drawings

RESIN COMPOSITION AND RESIN MOLDED ARTICLE

CROSS-REFERENCE TO RELATED APPLICATIONS

This application is based on and claims priority under 35 USC 119 from Japanese Patent Application No. 2015-064719 filed Mar. 26, 2015.

BACKGROUND

Technical Field

The present invention relates to a resin composition and a resin molded article.

SUMMARY

According to an aspect of the invention, there is provided a resin composition including:
a non-substituted cellulose resin having a weight average molecular weight in a range of 10,000 to 75,000.

DETAILED DESCRIPTION

Hereinafter, embodiments which are an example of the invention are described. These embodiments and examples exemplify the invention, and do not intend to limit the scope of the invention.

When amounts of respective components in a composition are described in the specification, and if plural kinds of materials corresponding to respective components exist in the composition, the amounts mean total amounts of the plural kinds of materials existing in the component, unless described otherwise.

Resin Composition

The resin composition according to the exemplary embodiment contains a non-substituted cellulose resin having a weight average molecular weight in the range of 10,000 to 75,000. Hereinafter, a non-substituted cellulose resin having a weight average molecular weight in the range of 10,000 to 75,000 may be called a "specific cellulose resin".

In addition, the resin composition according to the exemplary embodiment contains a specific cellulose resin as a main component. The main component refers to a component of which a content ratio (on a weight basis) is greatest among the respective components contained in the resin composition.

Since the resin composition according to the exemplary embodiment contains a specific cellulose resin, a resin molded article having a small dimensional change caused by water absorption may be obtained, compared with a case in which a non-substituted cellulose resin having a weight average molecular weight greater than 75,000 or a cellulose ester resin having a weight average molecular weight greater than 75,000 is only included as a resin. The reason is not clear, but the reason is assumed as follows.

Generally, cellulose resins extracted from natural plants or the like have weight average molecular weights of about 200,000 in many cases. Since the cellulose resin of which a weight average molecular weight is great (particularly, greater than 75,000) has a rigid chemical structure and strong intramolecular or intermolecular hydrogen bonding strength, thermal, fluidity is low, it is difficult to use the cellulose resin in resin molding such as injection molding.

As a method of molding the cellulose resin, for example, a method for enhancing thermal fluidity by substituting a hydroxyl group of a cellulose resin, forming a cellulose ester resin, and decreasing a melting point, a method for enhancing thermal fluidity by adding a plasticizer to a non-substituted cellulose resin, or the like is used.

However, it has been known that, in a cellulose ester resin or a non-substituted cellulose resin having a weight average molecular weight greater than 75,000, water absorbing properties of a resin molded article obtained by molding are high and a dimensional change of the molded article by water absorption easily occurs.

On the contrary, according to the exemplary embodiment, the specific cellulose resin is contained as a main component. Since the specific cellulose resin has a smaller molecular weight than a cellulose resin of which the weight average molecular weight is greater than 75,000, the number of the hydroxyl groups (hereinafter, also referred to as "terminal hydroxyl group") positioned at terminals are great, and thus the specific cellulose resins are strongly bonded to each other by many hydrogen bonds. In addition, compared with the cellulose ester resin in which a hydroxyl group is substituted, the specific cellulose resin has a great number of hydroxyl groups in total, and the specific cellulose resins are more strongly bonded to each other by many hydrogen bonds. In this manner, it is considered that, in the specific cellulose resin, due to strong hydrogen bonds, it is difficult that water molecules enter a portion between cellulose molecules, and it is difficult that the dimensional change occurs by water absorption.

For the reasons above, it is assumed that, in the resin molded article using the resin composition according to the exemplary embodiment, a dimensional change of the molded article caused by water absorption is small, compared with a case in which the non-substituted cellulose resin having a weight average molecular weight greater than 75,000 or the resin composition containing a cellulose ester resin as a main component is used.

In addition, in the non-substituted cellulose resin having a weight average molecular weight less than 10,000, too many hydroxyl groups exist, and thus a degree of compatibility of hydroxyl groups with water molecules is greater than a degree of preventing intrusion of water molecules by the strong hydrogen bond. As a result, the water absorption amount is great, and the dimensional change may become great.

However, it is assumed that, since the resin composition according to the exemplary embodiment contains the specific cellulose resin as a main component, it is possible to obtain a resin molded article in which a dimensional change by water absorption is small, compared with a case in which the non-substituted cellulose resin having a weight average molecular weight less than 10,000 is contained as a main component.

In addition, since the specific cellulose resin has a small molecular weight, which is different from the conventional non-substituted cellulose resin having a weight average molecular weight greater than 75,000, the specific cellulose resin has thermoplasticity even if the plasticizer is not added. Therefore, even if a plasticizer is not contained in the resin composition according to the exemplary embodiment, a resin molded article may be formed. Particularly, if the plasticizer has water absorbing properties, a dimensional change due to water absorption caused by the plasticizer is prevented by using a resin composition containing a specific cellulose resin and not containing the plasticizer.

According to the exemplary embodiment, it is desirable that a content of the specific cellulose resin with respect to the total amount of the resin composition (hereinafter, simply referred to as "content of specific cellulose resin") is 70% by weight or greater. If the content of the specific cellulose resin is in the range described above, it is possible to obtain a resin molded article having a small dimensional change by the water absorption compared with a case in which a content of the specific cellulose resin is less than the range described above. The reason is not clear, but the reason is assumed as follows.

If the content of the specific cellulose resin is in the range described above, the hydrogen bond of the specific cellulose resin by components other than the specific cellulose resin (hereinafter, also referred to as "other component") is hardly weakened compared with a case in which the content is less than the range described above. If the weakening of the hydrogen bond to other components hardly occurs, water molecules hardly enter a portion between molecules of the cellulose. Also, a dimensional change by water absorption caused by the water molecule entering a portion between molecules of the cellulose also hardly occurs. For the above reasons, it is assumed that, if the content of the specific cellulose resin is in the range described above, a resin molded article having a small dimensional change by water absorption may be obtained compared with a case in which the content is less than the range described above.

Hereinafter, the components of the resin composition according to the exemplary embodiment are described in detail.

Specific Cellulose Resin

The resin composition according to the exemplary embodiment contains a non-substituted cellulose resin (specific cellulose resin) having a weight average molecular weight in the range of 10,000 to 75,000. Specifically, as the specific cellulose resin, for example, a resin which is represented by the formula (1) and has a weight average molecular weight in the range of 10,000 to 75,000 is included. In addition, in the formula (1), n is an integer 1 or greater.

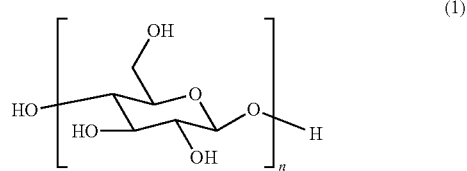

(1)

The weight average molecular weight (Mw) of the specific cellulose resin is in the range of 10,000 to 75,000 as described above. In view of further preventing a dimensional change by water absorption, the weight average molecular weight is preferably in the range of 20,000 to 60,000, and more preferably in the range of 30,000 to 50,000.

A method of adjusting a molecular weight of the cellulose resin is not particularly limited, and, for example, a method of decreasing a molecular weight by stirring commercially available cellulose in liquid, and the like are included.

By adjusting the speed and the time when the cellulose is stirred, the molecular weight of the cellulose may be adjusted to a required value. In addition, though not particularly limited, the stirring speed when the cellulose is stirred is preferably in the range of 50 rpm to 3,000 rpm, and more preferably in the range of 100 rpm to 1,000 rpm. In addition, the stirring time is preferably in the range of 2 hours to 48 hours, and more preferably in the range of 5 hours to 24 hours.

In addition, as the liquid which is used in stirring the cellulose, an aqueous solution of hydrochloric acid, an aqueous solution of formic acid, an aqueous solution of acetic acid, an aqueous solution of nitric acid, and an aqueous solution of sulfuric acid are exemplified.

Here, the weight average molecular weight (Mw) is a value measured by gel permeation chromatography (GPC). Specifically, the molecular weight by GPC is measured with a GPC apparatus (manufactured by Tosoh corporation, HLC-8320GPC, Column: TSKgel α-M) by using a solution of dimethylacetamide/lithium chloride having a volume ratio of 90/10. In addition, the measurement condition is a measurement temperature of 40° C., a flow velocity of 1.0 ml/min, a sample concentration of 0.1% by weight, and RI detection.

Also, the weight average molecular weight is calculated by using a molecular weight calibration curve obtained by a monodispersed polystyrene standard sample from the measurement result. Specifically, a weight average molecular weight is calculated based on respective maximum peaks of a molecular weight calibration curve. That is, the "cellulose resin having a weight average molecular weight in the range of 10,000 to 75,000" means a cellulose resin of which a weight average molecular weight calculated from one maximum peak in a molecular weight calibration curve is in the range of 10,000 to 75,000.

In addition, for example, if the molecular weight calibration curve obtained by the measurement has two maximum peaks, the resin is a mixture of two kinds of cellulose resins having different weight average molecular weights, and two different kinds of weight average molecular weights are calculated based on the two maximum peaks. The above is applicable to a case in which the molecular weight calibration curve has three or more maximum peaks.

The resin composition may contain one kind of the specific cellulose resin, or may contain two or more kinds of specific cellulose resins having different weight average molecular weights.

In addition, the content of the specific cellulose resin is preferably 70% by weight or greater as described above, and more preferably 80% by weight or greater with respect to the total amount of the resin composition.

In addition, if a resin composition contains two or more specific cellulose resins having different weight average molecular weights, a content of the specific cellulose means a total (total content of specific cellulose resin) of respective contents of the two or more specific cellulose resins having different weight average molecular weights.

Other Components

The resin composition according to the exemplary embodiment may contain the specific cellulose resins as a main component, and may further contain other components (components other than specific cellulose resins), if necessary. As the other components, for example, a flame retardant, a compatibilizer, a plasticizer, an antioxidant, a release agent, a light resistant agent, a weather resistant agent, a colorant, a pigment, a modifier, a drip preventing agent, an antistatic agent, a hydrolysis inhibitor, a filler, and a reinforcing agent (glass fiber, carbon fiber, talc, clay, mica, glass flake, milled glass, glass bead, crystalline silica, alumina, silicon nitride, aluminum nitride, boron nitride, and the like) are included.

In addition, the resin composition according to the exemplary embodiment may contain resins (hereinafter, also referred to as "other resins") other than the specific cellulose resin, as other components, if necessary. However, if the resin composition contains other resins, the total content of the specific cellulose resin is preferably 70% by weight or greater, more preferably 90% by weight or greater, and still more preferably 95% by weight or greater, with respect to the total amount of the resins included in the resin composition.

As the other resins, for example, the thermoplastic resins which are well-known so far are included. Specifically, polycarbonate resin; polypropylene resin; polyester resin; a polyolefin resin; polyester carbonate resin; a polyphenylene ether resin; polyphenylene sulfide resin; a polysulfone resin; polyether sulfone resin; a polyarylene resin; a polyetherimide resin; a polyacetal resin; a polyvinyl acetal resin; a polyketone resin; a polyetherketone resin; a polyetheretherketone resin; a polyarylketone resin; a polyether nitrile resin; a liquid crystal resin; a polybenzimidazole resin; polyparabanic acid resin; a vinyl copolymer or a vinyl copolymer resin obtained by polymerizing or copolymerizing one or more vinyl monomers selected from the group consisting of an aromatic alkenyl compound, a methacrylic acid ester, acrylic acid ester, and a vinyl cyanide compound; a diene-aromatic alkenyl compound copolymer resin; a vinyl cyanide-diene-aromatic alkenyl compound copolymer resin; an aromatic alkenyl compound-diene-vinyl cyanide-N-phenyl-maleimide copolymer resin; a vinyl cyanide-(ethylene-diene-propylene (EPDM))-aromatic alkenyl compound copolymer resin; polyolefin; a vinyl chloride resin; a chlorinated polyvinyl chloride; a cellulose resin derivative such as a cellulose ester resin; and a non-substituted cellulose resin having a weight average molecular weight out of the range described above. These resins may be used singly, or two or more types thereof may be used in combination.

Adipic Acid Ester-Containing Compound

As an example of other components that are contained in the resin composition, an adipic acid ester-containing compound which is used as a plasticizer is described below.

If the resin composition contains the adipic acid ester-containing compound, due to high compatibility between the adipic acid ester and the cellulose, thermal fluidity of the entire resin composition is enhanced.

Here, the adipic acid ester-containing compound (compound containing adipic acid ester) indicates a single compound of adipic acid ester or a mixture of adipic acid ester and a component other than the adipic acid ester (compound different from adipic acid ester).

However, the adipic acid ester-containing compound may contain 50% by weight or more of adipic acid ester with respect to a total component of the adipic acid ester-containing compound. If the adipic acid ester-containing compound contains 50% by weight or more of the adipic acid ester with respect to the total component of the adipic acid ester-containing compound, an effect of enhancing thermoplasticity of the resin composition may be easily obtained.

In addition, the content of the adipic acid ester-containing compound is preferably 10% by weight or lower with respect to the total amount of the resin composition. If the content of the adipic acid ester-containing compound is in the range described above, it is considered that the weakening of the hydrogen bond in the specific cellulose resin caused by the adipic acid ester hardly occurs and the dimensional change of the molded article by water absorption becomes small, compared with the case in which the content is greater than the range described above.

As the adipic acid ester, for example, an adipic acid diester and an adipic acid polyester are exemplified. Specifically, an adipic acid diester represented by the formula (2-1) and an adipic acid polyester represented by the formula (2-2) are exemplified.

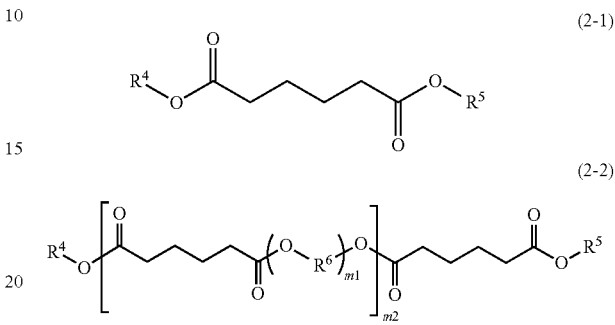

In the formulae (2-1) and (2-2), $R^4$ and $R^5$ each independently represents an alkyl group, or a polyoxyalkyl group [—$(C_xH_{2X}$—O$)_y$—$R^{Al}$] (provided that $R^{Al}$ represents an alkyl group, x represents an integer in the range of 1 to 10, and y represents an integer in the range of 1 to 10).

$R^6$ represents an alkylene group.

m1 represents an integer in the range of 1 to 20.

m2 represents an integer in the range of 1 to 10.

In the formulae (2-1) and (2-2), an alkyl group represented by $R^4$ or $R^5$ is preferably an alkyl group having 1 to 6 carbon atoms, and more preferably an alkyl group having 1 to 4 carbon atoms. The alkyl group may have any one of a linear shape, a branched shape, or a cyclic shape, but preferably a linear shape or a branched shape.

In the formulae (2-1) and (2-2), in the polyoxyalkyl groups [—$(C_xH_{2X}$—O$)_y$—$R^{Al}$] represented by $R^4$ and $R^5$, the alkyl group represented by $R^{Al}$ is preferably an alkyl group having 1 to 6 carbon atoms, and more preferably an alkyl group having 1 to 4 carbon atoms. The alkyl group may have any one of a linear shape, a branched shape, or a cyclic shape, but preferably a linear shape and a branched shape.

x preferably represents an integer in the range of 1 to 10.

y preferably represents an integer in the range of 1 to 10.

In the formula (2-2), the alkylene group represented by $R^6$ is preferably an alkylene group having 1 to 6 carbon atoms, and more preferably an alkylene group having 1 to 4 carbon atoms. The alkylene group represented by $R^6$ may have any one of a linear shape, a branched shape, or a cyclic shape, but preferably a linear shape and a branched shape.

In the formulae (2-1) and (2-2), the group represented by each of $R^4$ to $R^6$ may be substituted with a substituent. As the substituent, an alkyl group, an aryl group, and a hydroxyl group are exemplified.

The molecular weight of the adipic acid ester (or weight average molecular weight) is preferably in the range of 200 to 5,000, and more preferably in the range of 300 to 2,000. The weight average molecular weight is a value measured according to the method of measuring the weight average molecular weight of the cellulose derivative described above.

Specific examples of the adipic acid ester-containing compound are described below, but the invention is not limited thereto.

| Name of Material | Name of Product | Manufacturer |
|---|---|---|
| ADP1 | Adipic acid diester | Daifatty 101 | Daihachi Chemical Industry Co., Ltd. |
| ADP2 | Adipic acid diester | Adeka Cizer RS-107 | ADEKA Corporation |
| ADP3 | Adipic acid polyester | Polycizer W-230-H | DIC Corporation |

Method of Preparing Resin Composition

The resin composition according to the exemplary embodiment is prepared, for example, by melting and kneading the mixture of the cellulose derivative and the components described above. In addition, the resin composition according to the exemplary embodiment is prepared by dissolving the components in a solvent. As a melting and kneading unit, well known units are included, and specifically, for example, a twin screw extruder, a Henschel mixer, a Banbury mixer, a single screw extruder, a multi-screw extruder, and a co-kneader are included.

In addition, the temperature at the time of kneading may be determined according to the melting temperature of the cellulose derivative used, but in view of the thermal decomposition and the fluidity, the temperature in the range of 140° C. to 240° C. is preferable, and the temperature in the range of 160° C. to 200° C. is more preferable.

Resin Molded Article

The resin molded article according to the exemplary embodiment includes the resin composition according to the exemplary embodiment. That is, the resin molded article according to the exemplary embodiment is made of the same composition as the resin composition according to the exemplary embodiment.

Specifically, the resin molded article according to the exemplary embodiment may be obtained by molding the resin composition according to the exemplary embodiment. As the molding method, injection molding, extrusion molding, blow molding, heat press molding, calendaring molding, coating molding, cast molding, dipping molding, vacuum molding, transfer molding and the like may be applied.

As the method of molding the resin molded article according to the exemplary embodiment, since degrees of freedom in shape are high, injection molding is preferable. With respect to injection molding, the resin composition is heated and melted, casted into a mold, and solidified, so as to obtain a molded article. The resin composition may be molded by injection compression molding.

The cylinder temperature of the injection molding is, for example, in the range of 140° C. to 240° C., preferably in the range of 150° C. to 220° C., and more preferably in the range of 160° C. to 200° C. The mold temperature of the injection molding is, for example, in the range of 30° C. to 120° C., and more preferably in the range of 40° C. to 30° C. The injection molding may be performed, for example, by using a commercially available apparatus such as NEX500 manufactured by Nissei Plastic Industrial Co., Ltd., NEX150 manufactured by Nissei Plastic Industrial Co., Ltd., NEX70000 manufactured by Nissei Plastic Industrial Co., Ltd., and SE50D manufactured by Toshiba Machine Co., Ltd.

The resin molded article according to the exemplary embodiment may be appropriately used for the purposes of electric and electronic apparatuses, business machines, home appliances, automobile interior materials, engine covers, car bodies, containers, and the like. More specifically, the resin molded article may be used in housings of electric and electronic apparatuses or home appliances; various components of electric and electronic apparatuses or home appliances; interior components of automobiles; storage cases of CD-ROM, DVD, and the like; food containers; drink bottles; food trays; wrapping materials; films; and sheets.

Examples

The invention is specifically described with reference to the examples, but the invention is not limited to the examples.

Preparation of Cellulose Resins (Compound 1 to Compound 5)

2 kg of cellulose (KC Flock W50 manufactured by Nippon Paper Industries Co., Ltd.) is put into 20 L of 0.1 M hydrochloric acid aqueous solution, and stirred at room temperature (25° C.). By changing the stirring time as shown in Table 1, cellulose resins having respective weight average molecular weights (Compounds 1 to 5) are obtained. In addition, EP-1800 (product name, manufactured by Shinto Scientific Co., Ltd.) is used as a stirring apparatus, and the rotation speed at the time of stirring is set to 500 rpm. The weight average molecular weight is measured with a GPC apparatus (manufactured by Tosoh corporation, HLC-8320GPC, Column: TSEgel α-M), by using a solution of dimethylacetamide/lithium chloride having a volume ratio of 90/10.

TABLE 1

| Compound | Stirring time (hours) | Weight average molecular weight |
|---|---|---|
| 1 | 0.3 | 75,500 |
| 2 | 1 | 57,800 |
| 3 | 2 | 31,000 |
| 4 | 3 | 10,300 |
| 5 | 5 | 9,400 |

Preparation of Compounds 6 to 11

Cellulose derivatives (C-1) to (C-6) obtained in the methods described in Synthesis examples 1 to 6 of Japanese Patent No. 5,470,032 are set to Compounds 6 to 11. With respect to the obtained Compounds 6 to 11, weight average molecular weights are measured and calculated in the method described above, kinds of substitutents, and substitution degrees of respective substitutents are shown in Table 2. In addition, the substitution degree means an intramolecular average of the number of substitutions in which three hydroxyl groups included in a D-glucopyranose unit of the cellulose ester resin are substituted with an acyl group, and is indicated by numbers in parentheses in Table 2.

TABLE 2

| Compound | Weight average molecular weight | Substituent (Substitution degree) |
|---|---|---|
| 6 | 185,000 | Methyl (1.95)/Propyleneoxy acetyl + acetyl (1.05) |
| 7 | 617,000 | Methyl (1.84)/Propyleneoxy acetyl + acetyl (1.16) |
| 8 | 770,000 | Methyl (1.47)/Propyleneoxy acetyl + acetyl (1.53) |
| 9 | 680,000 | Methyl (1.45)/Propyleneoxy acetyl + acetyl (1.55) |
| 10 | 402,000 | Methyl (1.50)/Propyleneoxy propionyl + propionyl (1.50) |
| 11 | 237,000 | Methyl (1.43)/Propyleneoxy acetyl + acetyl (1.57) |

Compounds 12 to 13

As Compounds 12 to 13, the following compounds are used, respectively.

Compound 12: Dimethyl cellulose (L50 manufactured by Daicel Corporation, weight average molecular weight: 170,000)

Compound 13: Adipic acid ester mixture (Daifatty 101 manufactured by Daihachi Chemical Industry Co., Ltd.)

Examples and Comparative Examples

Kneading

The materials in compositions shown in Table 3 (Compounds 1 to 13) are introduced to a twin screw kneading apparatus (TEX41SS manufactured by Toshiba Machine Co., Ltd.) and kneaded at kneading temperatures shown in Table 3, so as to obtain pellets (hereinafter, referred to as "resin pellets") of the resin compositions. In addition, the Dimensional Change by Water Absorption The obtained D2 test samples are hung and kept in a thermohygrostat bath in the environment of 65° C./85% RH for 24 hours, and then dimensional change rates in the length direction (MD direction) and the width direction (TD direction) are measured by a microscope type dimension measuring device (STM6-LM manufactured by Olympus Corporation).

Incidentally, the dimensional change rate by water absorption shown in Table 3 each is a value obtained by averaging the ratio (%) changed in the MD direction and the ratio (%) changed in the TD direction, when the length (MD direction) and the width (TD direction) before each sample is kept in the thermohygrostat bath are respectively set to 100(%).

TABLE 3

| | Compounds 1 to 5 | | Compound 13 | Compound 12 | Compounds 6 to 11 | | Kneading temperature (° C.) | Cylinder temperature (° C.) | Mold temperature (° C.) | Dimensional change rate by water absorption (%) |
|---|---|---|---|---|---|---|---|---|---|---|
| | Kind | Amount | Amount | Amount | Kind | | | | | |
| Example 1 | Compound 2 | 100 | — | — | — | | 260 | 260 | 80 | 0.15 |
| Example 2 | Compound 3 | 100 | — | — | — | | 260 | 260 | 80 | 0.15 |
| Example 3 | Compound 4 | 100 | — | — | — | | 250 | 250 | 80 | 0.12 |
| Example 4 | Compound 2 | 91 | 9 | — | — | | 220 | 220 | 80 | 0.18 |
| Example 5 | Compound 2 | 88 | 12 | — | — | | 220 | 220 | 80 | 0.22 |
| Example 6 | Compound 2 | 75 | — | 25 | — | | 240 | 240 | 80 | 0.16 |
| Example 7 | Compound 2 | 65 | — | 35 | — | | 240 | 240 | 80 | 0.24 |
| Comparative Example 1 | Compound 1 | 100 | — | — | — | | Kneading is not possible | | | |
| Comparative Example 2 | Compound 5 | 100 | — | — | — | | 250 | 250 | 80 | 0.58 |
| Comparative Example 3 | Compound 1 | 91 | 9 | — | — | | 300 | 300 | 80 | 0.65 |
| Comparative Example 4 | Compound 5 | 91 | 9 | — | — | | 240 | 240 | 80 | 0.69 |
| Comparative Example 5 | — | — | — | — | Compound 6 | | 180 | 180 | 40 | 1.05 |
| Comparative Example 6 | — | — | — | — | Compound 7 | | 190 | 190 | 40 | 0.99 |
| Comparative Example 7 | — | — | — | — | Compound 8 | | 180 | 180 | 40 | 1.18 |
| Comparative Example 8 | — | — | — | — | Compound 9 | | 180 | 180 | 40 | 1.25 |
| Comparative Example 9 | — | — | — | — | Compound 10 | | 190 | 190 | 40 | 1.12 |
| Comparative Example 10 | — | — | — | — | Compound 11 | | 180 | 180 | 40 | 1.35 |

"amount" in Table 3 means an addition amount (parts by weight), and "—" means that the corresponding component is not contained.

However, in Comparative Example 1, even when the kneading temperature is raised to 300° C., Compound 1 is not melted and cannot be kneaded. In addition, in Comparative Examples 5 to 10, Compounds 6 to 11 (100 parts by weight) are kneaded, respectively, as they are.

Injection Molding

Except for Comparative Example 1, the obtained resin pellets are charged into an injection molding machine (PNX40 manufactured by Nissei Plastic Industrial Co., Ltd.), and injection-molded in the injection molding conditions (cylinder temperature and mold temperature) shown in Table 3, to thereby obtain D2 test samples having a length of 60 mm, a width of 60 mm, and a thickness of 2 mm.

Evaluation

The obtained D2 test samples are evaluated as follows. The results are shown in Table 3.

From the above results, it is understood that the dimensional change rates by water absorption of the Examples are smaller than those of the Comparative Examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin molded article having a resin composition comprising:
    a non-substituted cellulose resin represented by the following formula (1) and having a weight average molecular weight in a range of 10,000 to 75,000:

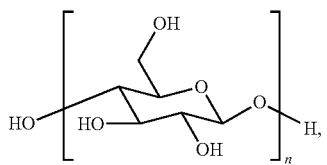

formula (1)

wherein n is an integer 1 or greater, and wherein
the resin molded article exhibits a dimensional change rate by water absorption of from 0.12 to 0.24%.

2. The resin molded article according to claim 1, wherein the non-substituted cellulose resin has a weight average molecular weight in a range of 20,000 to 60,000.

3. The resin molded article according to claim 1, wherein the non-substituted cellulose resin has a weight average molecular weight in a range of 30,000 to 50,000.

4. The resin molded article according to claim 1, wherein a content of the non-substituted cellulose resin with respect to a total amount of a resin composition is 70% by weight or greater.

5. The resin molded article according to claim 1, wherein a content of the non-substituted cellulose resin with respect to a total amount of a resin composition is 80% by weight or greater.

6. The resin molded article according to claim 1, further comprising an adipic acid ester-containing compound.

7. A resin molded article having a resin composition comprising:
    cellulose having a weight average molecular weight in a range of 10,000 to 75,000,
    wherein the resin composition does not contain a plasticizer, and wherein
    the resin molded article exhibits a dimensional change rate by water absorption of from 0.12 to 0.24%.

* * * * *